(12) United States Patent
Ruth et al.

(10) Patent No.: US 7,504,594 B1
(45) Date of Patent: Mar. 17, 2009

(54) STEEL COIL WEIGHING APPARATUS AND METHOD FOR USE THEREOF

(75) Inventors: Jessica Ruth, Macomb, MI (US); David Davolt, Dyersburg, TN (US); Marcus Kortan, Charlotte, NC (US)

(73) Assignee: Nucor Corporation, Charlotte, NC (US)

( * ) Notice: Subject to any disclaimer, the term of this patent is extended or adjusted under 35 U.S.C. 154(b) by 0 days.

(21) Appl. No.: 11/868,295

(22) Filed: Oct. 5, 2007

(51) Int. Cl.
G01G 21/00 (2006.01)
G01G 21/28 (2006.01)

(52) U.S. Cl. .................................. 177/128; 177/DIG. 9
(58) Field of Classification Search ................. 177/128, 177/DIG. 9
See application file for complete search history.

(56) References Cited

U.S. PATENT DOCUMENTS

| | | | | |
|---|---|---|---|---|
| 3,679,011 A * | 7/1972 | Hawver | ....................... | 177/134 |
| 3,698,496 A | 10/1972 | Lohmann | | |
| 3,993,150 A | 11/1976 | Brosh et al. | | |
| 3,997,014 A * | 12/1976 | Soderholm et al. | ........... | 177/128 |
| 4,411,327 A * | 10/1983 | Lockery et al. | ............. | 177/211 |
| 4,453,607 A | 6/1984 | Zink | | |
| 4,733,736 A | 3/1988 | Holtgreven et al. | | |
| 4,757,867 A * | 7/1988 | Rosenthal et al. | ............ | 177/255 |
| 4,899,840 A * | 2/1990 | Boubille | ....................... | 177/139 |
| 5,244,561 A * | 9/1993 | Calzi et al. | ................... | 205/778 |
| 5,257,668 A * | 11/1993 | Sargent et al. | .............. | 177/146 |
| 5,739,478 A | 4/1998 | Zefira | | |
| 5,801,339 A * | 9/1998 | Boult | ......................... | 177/261 |
| 5,831,221 A * | 11/1998 | Geringer et al. | ............. | 177/144 |
| 5,949,244 A * | 9/1999 | Miley | ......................... | 324/762 |
| 6,178,836 B1 | 1/2001 | Miyake et al. | | |
| 6,340,799 B1 * | 1/2002 | Hama et al. | .................. | 177/238 |
| 6,433,289 B1 * | 8/2002 | Gurr | ............................ | 177/238 |
| 6,596,949 B2 * | 7/2003 | Stimpson | .................... | 177/142 |
| 6,812,414 B2 | 11/2004 | Nakagawa | | |
| 7,214,893 B2 * | 5/2007 | Sikula | ......................... | 177/238 |

* cited by examiner

*Primary Examiner*—Randy W Gibson
(74) *Attorney, Agent, or Firm*—Hahn Loeser & Parks LLP

(57) ABSTRACT

A steel coil weighing apparatus includes a base having a structure capable of supporting the weighing apparatus and an article to be weighed and having a base portion capable of contact with a load cell, a platform positioned above the base and having a platform portion capable of contact with a load cell, at least one load cell positioned between the base portion and the platform portion and capable of providing a signal corresponding to the weight of an article to be weighed, and at least one guide capable of aligning the base and the platform.

12 Claims, 6 Drawing Sheets

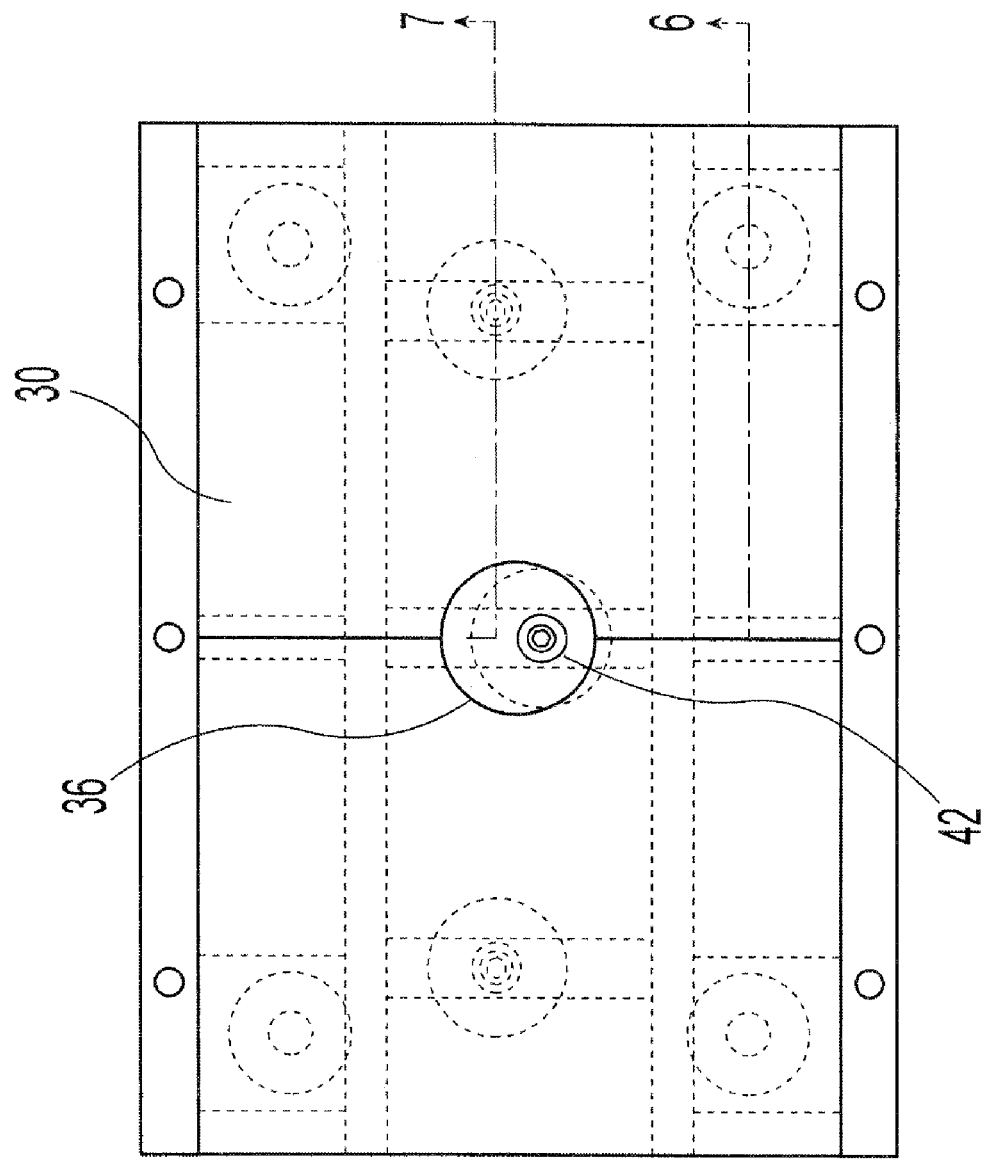

STEEL COIL WEIGHING APPARATUS AND METHOD FOR USE THEREOF

BACKGROUND AND SUMMARY OF THE DISCLOSURE

This invention relates to weighing systems, and more particularly to an apparatus and method for weighing steel coils.

Steel coils, and other similar coils, are weighed at various times during their production and distribution using coil scales or other coil weighing apparatuses. The coil weighing apparatuses may be located in steel mills and other locations where the environment may include heat, dust, vibration, and other factors. Further, coils are heavy, weighing up to 60,000 pounds (27,000 kilograms) or more. In a production environment, a coil weighing apparatus incurs ongoing maintenance costs due to use and environment.

Coil weighing apparatuses use load cells for measuring the weight of a coil. The accuracy and longevity of load cells may be reduced by factors such as uneven loading, impact shocks to the cell, overloading, and other use and environmental considerations. When placing a heavy coil on a coil scale, the coil may be dropped onto the scale, not placed evenly onto the scale, or may be misaligned resulting in the coil rolling or bouncing and possibly causing deformation of the scale and load cells. For this reason, maintenance and replacement of load cells in a weighing apparatus has been necessary.

Maintenance of coil weighing apparatuses may include changing load cells due to damage or for routine replacement. Additionally, when past coil weighing systems were subjected to deformation, shims were placed under portions of the scale to maintain proper alignment and attachment of the load cells. Other periodic or occasional maintenance and repair may be required, such as lubrication of moving parts.

However, past coil weighing systems have been difficult to assemble, repair, and maintain. For maintenance or repair of past coil scales or weighing systems, the entire coil weighing system had to be lifted out and disassembled, thereby increasing maintenance costs. Some past coil weighing systems required as much at twelve hours for disassembly and reassembly. Increased maintenance time resulted in reduced operational time for both the scale and the production operation utilizing the coil scale.

Some past weighing systems included a base and a weighing platform where certain platform members were integrally connected to the base. In the past, such integration weighing systems were thought necessary for achieving the rigidity needed for weighing heavy steel coils. Additionally, integrated structures were thought necessary to maintain alignment of the weighing assembly during operation and to resist the forces created when steel coils were placed upon the weighing apparatus.

The platform integrated with the base of prior weighing apparatuses complicated maintenance tasks and increased maintenance costs. When platform members were integrated with the base, additional time was required to disassemble the weighing apparatus for service or repair. This additional time increased the maintenance costs and also decreased the utilization of the weighing apparatus. Because a weighing apparatus may be an essential component of the steel production process, the additional maintenance time also decreased the productivity of an entire production line.

Further, the weight capacity and measurement accuracy of a coil weighing system depends in part upon the selection of the load cell. Thus, in steel coil production operations producing coils of different sizes and weights, certain load cells had to be changed to accommodate different weight coils. With load cells being difficult to change in past coil weighing systems, adapting to different size coils was difficult and time consuming, if even possible. Past weighing apparatuses had to be disassembled and reassembled, risking damage to the load cells and other components in the weighing system. In the past, it was impractical to use one coil weighing apparatus when different sizes or weights of coils needed to be weighed.

Certain portions of coil weighing apparatuses in the past have also been susceptible to corrosion and deterioration. Steel coils have been produced from pickled, tempered, cold rolled, galvanized, and other types of steel. Additionally, the steel formed into steel coils may have been coated with other types of coatings and chemical treatments. The coatings and other chemicals used during the steel manufacturing process have contacted the components of prior steel coil weighing systems. As a result, care had to be taken to protect past coil weighing apparatuses from corrosion adding to the cost of the weighing system.

Other weighing systems have emphasized the need to protect load cells from damage (see U.S. Pat. No. 5,739,478). Such past systems have required disengaging the load cells prior to placing an article to be weighed on a weighing platform. In this fashion, transitional or shock loads could be dissipated prior to engagement of the load cells. While this design may have protected the load cell from a shock load, these past systems added complexity and cost to the design and maintenance of the weighing system.

There continues to be a need for weighing apparatuses with improved maintenance and operational costs.

The disclosed steel coil weighing apparatus comprises a base having a structure capable of supporting the weighing apparatus and an article to be weighed and having a base portion capable of contact with a load cell, a platform positioned above the base and having a platform portion capable of contact with a load cell, at least one load cell positioned between a base portion and a platform portion capable of providing a signal corresponding to the weight of an article to be weighed, and at least one guide capable of aligning the base and the platform.

Also disclosed is a method of weighing a steel coil comprising assembling a steel coil weighing apparatus, aligning the platform and the base, the alignment being accomplished by the guide, positioning a steel coil on the platform, receiving the signal provided by the load cell, and calculating the weight of the steel coil.

BRIEF DESCRIPTION OF THE DRAWINGS

The present coil weighing apparatus is described below with reference to the following the drawings and figures:

FIG. 5 is a top view of the top portion of the base of FIG. 1;

DETAILED DESCRIPTION OF THE DRAWINGS

Figure 1:
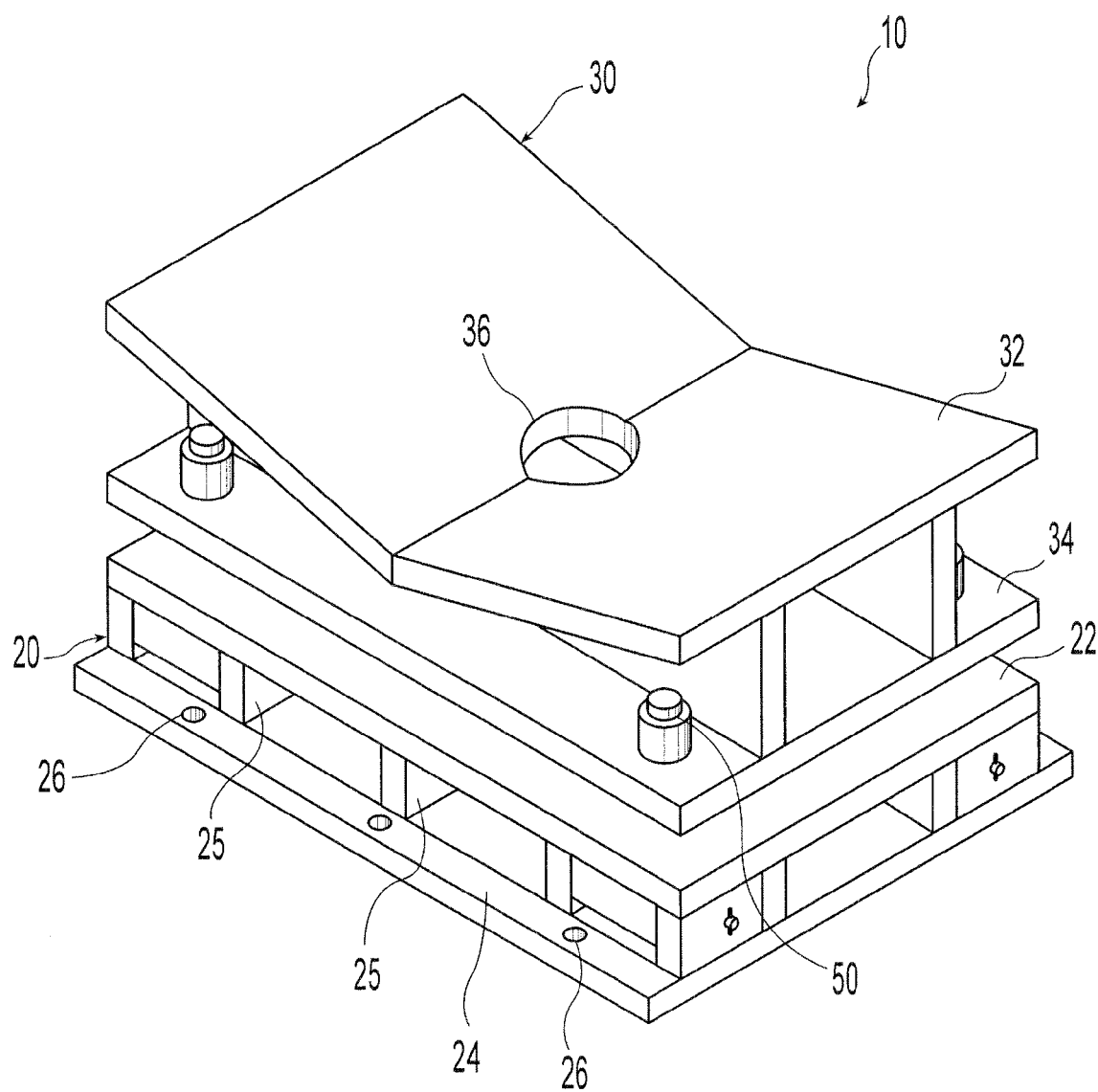
FIG. 1 is a perspective view of a steel coil weighing apparatus.

Referring generally to FIGS. 1 through 8, the present disclosure is a steel coil weighing apparatus 10 capable of weighing a steel coil 12, or other articles. As shown in FIG. 1, the weighing apparatus 10 has a base 20 and a platform 30 positioned above the base 20. At least one load cell 40 is operatively positioned between the base 20 and the platform 30. Each load cell 40 may be attached to the base 20, the platform 30, or both. Additionally, the weighing apparatus 10 may include at least one guide 50 capable of aligning the base 20 and the platform 30.

The base 20, as shown in FIG. 1, has a top portion 22 opposite a bottom portion 24. The base 20 may be solid or hollow, and may have internal supports, such as but not limited to internal base structure 25. The bottom portion 24 may be wider than the top portion 22, and apertures 26 or other cut-outs or recesses may be provided for bolting or otherwise affixing the base 20 to a floor or other structure. The base 20 may be a raised platform as shown in FIG. 1. Alternatively, the base may be other structural shapes capable of supporting the weight of an article to be weighed, such as the weight of a steel coil. The base 20 may be constructed of steel, stainless steel or other suitable materials. The base 20 may be coated with a corrosion resistant coating, such as but not limited to paint or polymer coating, zinc, zinc alloy, or other suitable corrosion resistant coating. Additionally, the base 20 may be bolted or welded to a floor or other supporting surface to keep the base stationary. Alternatively, the base 20 may be movable during operation. The base 20 may be an independent structure or may be integrated into another structure such as a floor, platform, or piece of machinery.

The platform 30 is positioned above the base 20 and capable of supporting a steel coil 12 to be weighed. The platform 30 may have a platform top portion 32 positioned above a platform bottom portion 34. An access hole 36 may be provided through the top portion 32. The platform 30 is sized to accommodate a steel coil to be weighed. In one example, the platform 30 may be about 22 inches (about 56 centimeters) by about 35 inches (about 89 centimeters). As shown in FIG. 1, the platform top portion 32 may include a saddle capable of retaining a coil. The saddle may be a V-shaped saddle. Alternatively, the saddle may be u-shaped or have a concave surface. Alternatively, the platform top portion 32 may be flat. The platform 30 may be rigid, flexible, or deformable under the weight of a steel coil. Additionally, the platform 30 may have a support structure between the top and bottom portions of the platform. The platform 30 may be adapted to reduce bouncing or rolling of steel coil positioned on the platform. The platform top portion 32 may also include features to restrain a steel coil 12. The platform 30 may be constructed of steel, stainless steel or other suitable material and may be coated in a corrosion resistant coating, such as but not limited to paint or polymer coating, zinc, zinc alloy, or other suitable corrosion resistant coating.

Each load cell 40 may be positioned between the base top portion 22 and the platform bottom portion 34. The load cell 40 may be affixed to the base top portion 22. Alternately or in addition, the load cell 40 may be affixed to the platform bottom portion 34. We have found that affixing one side of the load cells to either the base 20 or platform 30 and allowing the opposite side of the load cell to remain unattached provides additional load cell life. Alternately, a compressive load cell may be used that is neither affixed to the base nor the platform.

Figure 3:
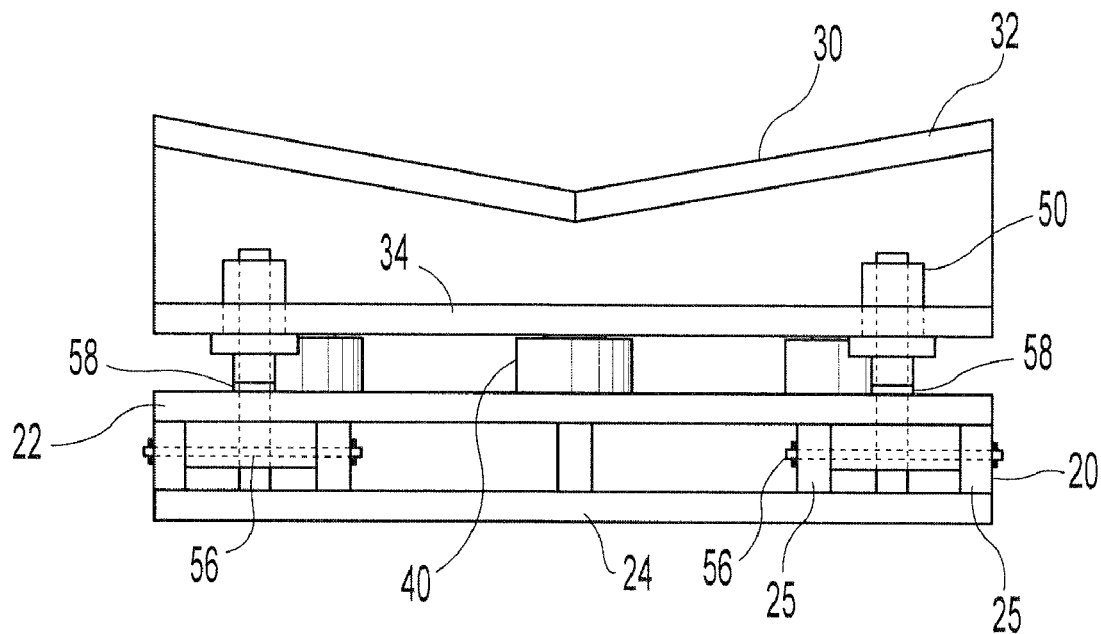
FIG. 3 is a front elevation view of the steel coil weighing apparatus of FIG. 1.
Figure 4:
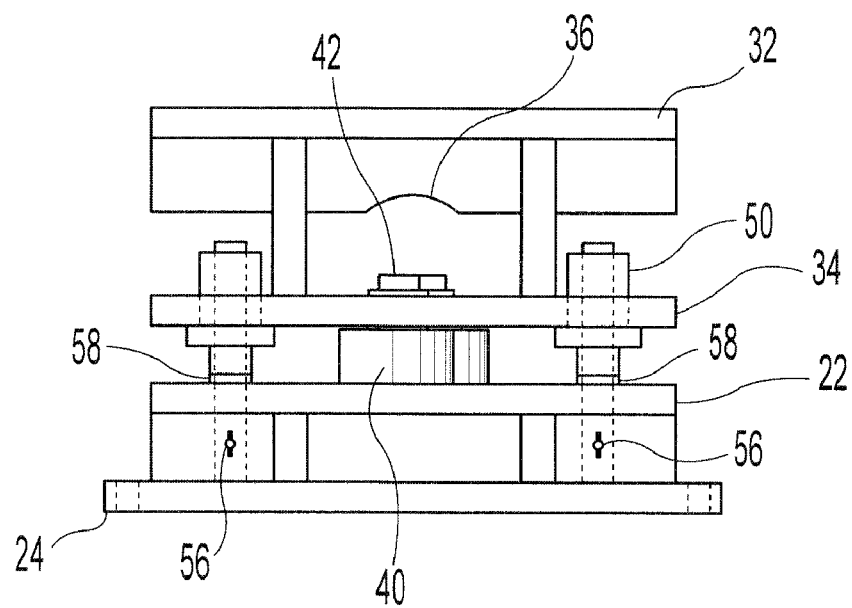
FIG. 4 is a side elevation view of the steel coil weighing apparatus of FIG. 1.
Figure 7:
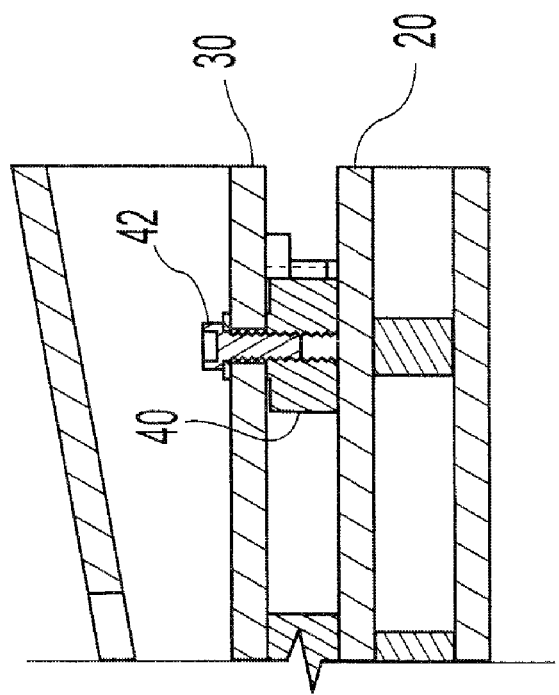
FIG. 7 is a section view along sectional line 7 of FIG. 5.
Figure 6:
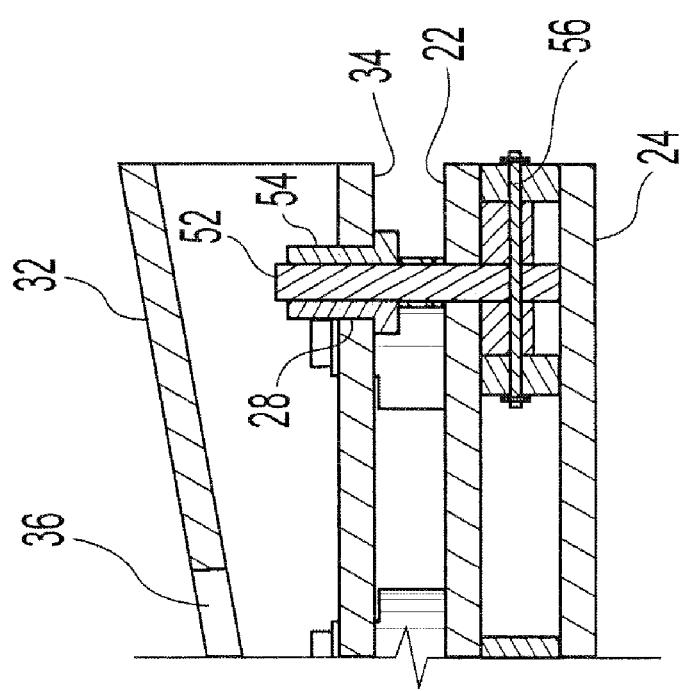
FIG. 6 is a section view along sectional line 6 of FIG. 5.

In one example shown in FIGS. 3 though 7, the load cell 40 is attached to the platform bottom portion 34 using a threaded fastener or bolt 42 positioned through the platform bottom portion 34 and engaging a threaded hole 44 in the load cell. The load cell may include at least one loading surface 46 or load button. The threaded hole 44 may be positioned through or be a part of the loading surface 46. The access hole 36 may enable access to one or more of the bolts 42 for reducing time to replace or repair load cells.

The load cell 40 may an analog or digital load cell. Alternatively, the load cell may be a strain gauge, electromagnetic force sensor or other type of weight sensing device known to those skilled in the art. The load cell 40 may be moisture protected and may be coated with a corrosion resistant coating. The load cell 40 may be a low profile load cell to reduce the overall height of the steel coil weighing apparatus 10. Additionally, the load cell may be configured to reduce inaccuracies caused by off-center or side loading.

Figure 2:
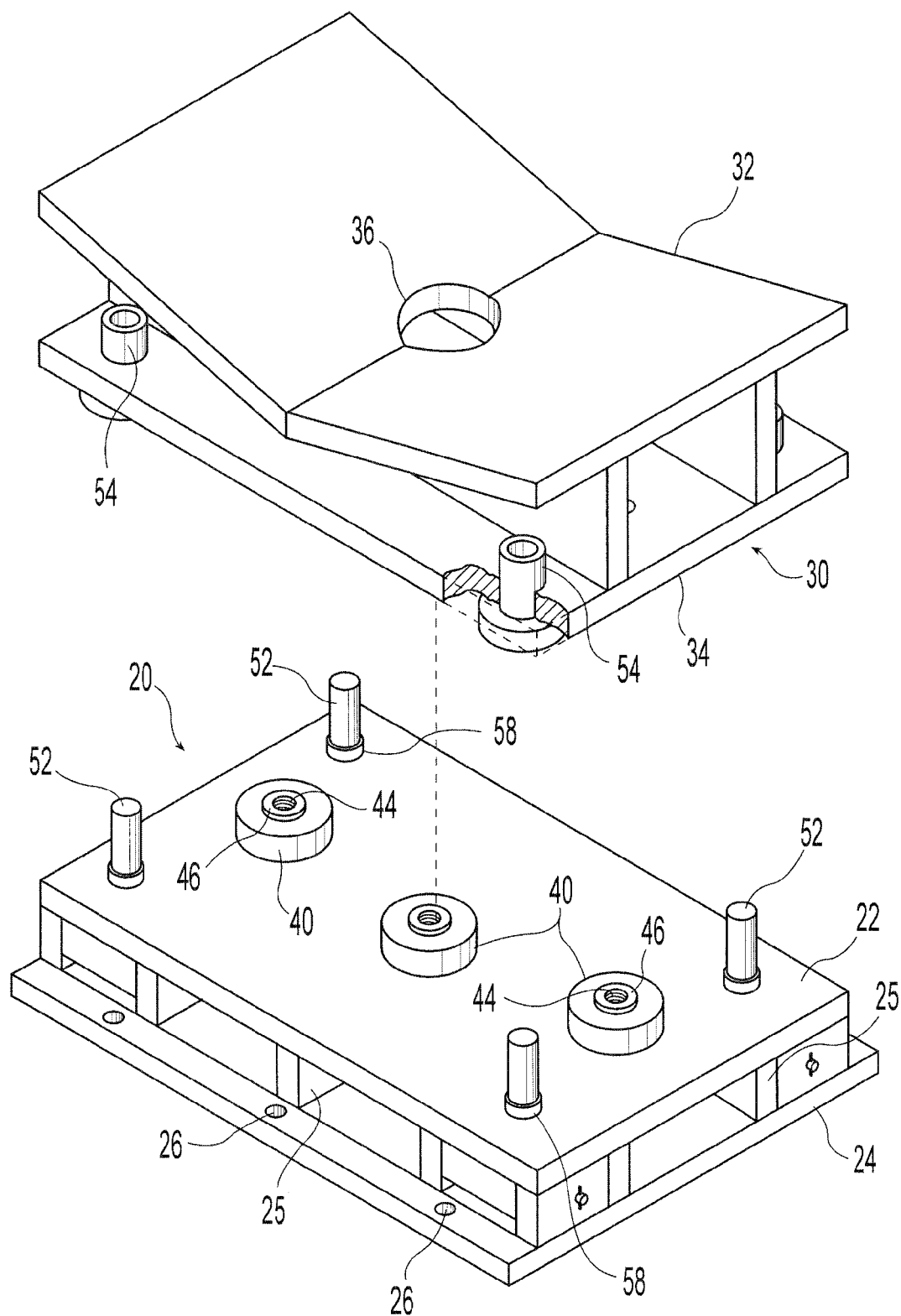
FIG. 2 is an exploded view of the steel coil weighing apparatus of FIG. 1.

The coil weighing apparatus 10 may include one load cell 40, or may have more than one load cell, such as two, or three or more. Multiple load cells 40 may be used to increase the measurement capacity of the weighing apparatus 10. Additionally, multiple load cells 40 may allow for increased accuracy during the measurement of greater weight articles. As shown in FIG. 2, a base top portion 22 is shown with three load cells 40. The load cells 40 may be in a non-linear arrangement as shown in FIGS. 2 and 5. The non-linear arrangement of load cells may improve the accuracy of the measurement of a steel coil 12 because the non-linear arrangement of the load cells 40 may enable each of the load cells 40 to remain in contact with the platform bottom portion 34 and the base top portion 22 as the platform 30 or base 20 deforms. This may reduce or eliminate the need to shim the load cells as was required with prior steel coil weighing systems. Alternatively, the load cells 40 may be arranged in a row.

The capacity of the load cell 40 is one consideration in determining the measurement capacity of the weighing apparatus 10. It may be desired to provide a measurement capacity greater than the weight of the heaviest steel coil to be weighed to provide a more robust apparatus. If a steel coil is dropped on the weighing apparatus, the transitional or shock load experienced by the load cells may be greater than the weight of the coil. Additionally, if a steel coil 12 rolls on the platform the load cell 40 may experience a force greater than the weight of the steel coil. As an article being placed on the weighing apparatus may not be exactly centered on the weighing apparatus 10 as it is lowered onto the platform 30, shock loads may be generated by the article rolling or bouncing upon the weighing apparatus. The load cells 40 and guides 50 may be selected accommodate the higher forces that may be experienced during this transitional period. In one example, the coil weighed may be about 60,000 pounds (about 27,000 kilograms); however, the capacity of the weighing apparatus may be selected as 150,000 pounds (about 68,000 kilograms) as determined by the ratings of the guide 50 and the load cell 40.

The steel coil weighing apparatus 10 may have one or more guides 50 having portions capable of aligning the platform 30 and the base 20. The guide 50 may be positioned between the base 20 and the platform 30 such that when the weighing apparatus is assembled the guide may align the platform 30 over the base 20. During assembly and use of the weighing apparatus, the guide 50 enables the platform 30 to move in a direction along the guide.

As shown in FIG. 2, the guide 50 may include a guide shaft 52 extending from the base and a guide sleeve 54 capable of moving along the shaft. One of the guide shaft 52 and guide sleeve 54 may be attached in a stationary position on the base 20, while the other is attached to the platform 30. In this way, the guide shaft may be attached to the base 20 while the guide sleeve 54 is attached to and moves with the platform 30.

Alternatively, the guide sleeve 54 may be attached to the base 20 while the guide shaft 52 is attached to and moves with the platform 30.

An aperture 28 may be positioned in the base 20, the platform 30, or both to provide a location for attachment of the guide 50. The guide sleeve 54 may be affixed in the guide aperture 28. In one alternate, the guide aperture 28 is formed to be the guide sleeve 54. The guide shaft 52 may be attached the base 20, or alternately the platform 30, using a fastener, such as but not limited to a roll pin 56, a snap ring or set collar 58, screws and/or bolts, welding, other fasteners capable of retaining the guide shaft 52, or a combination thereof. The fastener may serve to stabilize the guide shaft 52 during operation of the weighing apparatus. Additionally, the fastener may retain the guide shaft 52 when the platform 30 and base 20 are disassembled for maintenance or repair. The length of the guide shaft 52 may be selected to operatively connect the base 20 and the platform 30. The length of the guide shaft 52 may also be selected so as to align the platform over the base 20 during assembly and operation of the weighing apparatus. As shown in FIG. 3, a roll pin 56 or other fastener may be positioned through the internal base structure 25 and through the guide shaft 52. Alternately or in addition, a snap ring or set collar 58 may be positioned around the guide shaft 52 and affixed to the base 20. The set collar 58 may be affixed to the base 20 using fasteners, a press fit assembly, or other assembly method. Optionally, one or more grooves may be provided in the guide shaft 52 to engage the set collar 58.

The guide 50 may include a bushing, a slide bearing, linear bearing, or other bearing structures. The guide 50 may utilize a polymer on bearing or sliding surfaces to reduce friction as the platform 30 is depressed during weighing operations or being removed from the base. The guide shaft 52 may have any suitable cross sectional shape, such as but not limited to circular, rectangular, t-shape, or other cross sectional shape capable of providing bearing surfaces. The guide shaft 52 may be made from suitable steel such as a stainless steel and may be corrosion resistant and capable of operating in the environment of the weighing apparatus. The guide sleeve 54 may have bushings and/or bearings capable of operably engaging the bearing surfaces of the guide shaft 52.

In one example, four guides 50 may be used where at least one guide is a precision guide and remainder of the guides are compensating guides. In this configuration, the precision guide may restrict movement of the guide sleeve 54 to substantially one direction along the guide shaft 52. The precision guide may thus be used to maintain the vertical relationship between the platform and the base. The precision guides reduce non-vertical forces being applied to the load cells 40. The precision guide may be a precision linear bearing. The compensating guides restrict movement of the guide sleeve 54 to the direction along the guide shaft 52, but also allow limited lateral movement to assist with absorbing and dampening shock and transitional loads. When a steel coil 12 is placed on the platform 30 the coil may roll or bounce. The compensating guides may enable some lateral movement to accommodate the forces associated with this movement of the steel coil 12 to reduce damage to the load cells 40 and the weighing apparatus 10. Additionally, the compensating guides may accommodate misalignment of the platform 30 and base 20 during assembly so as to avoid binding of the guides 50 when the weighing apparatus 10 is assembled. The compensating guides may be self-aligning or compensating linear bearings.

The weighing apparatus 10 may have at least two guides, where at least one guide includes a precision linear bearing and at least one guide includes a self-aligning or compensating linear bearing. FIG. 2 illustrates a coil weighing apparatus utilizing four guides 50. Other configurations and numbers of guides 50 are also contemplated. The guides 50 may be selected so that the guides can accommodate forces caused by a greater weight than the weight to be measured by the weighing apparatus 10 to reduce the potential for damage to the guides during operation of the scale. Additionally, the guide 50 may be selected for ease of removing the platform from the base in a production environment. The guides 50 may require periodic lubrication, or guides may be selected that do not require lubrication.

As shown in FIG. 2, the coil weighing apparatus 10 may be disassembled by lifting the platform 30 such that at least a portion of the guide 50 disengages from the base 20. When the platform 30 is lifted from the base, the guide sleeve 54 moves up the guide shaft 52 and disengages from the guide shaft when the guide sleeve reaches the end of the guide shaft, thereby allowing the platform 30 to be removed. The disassembly of the coil weighing apparatus 10 may thus require less time than systems of the prior art. When the platform 30 is disengaged from the base 20, both the load cells 40 and the guide 50 may be accessible for maintenance and repair. Further, the load cells 40 may be changed to accommodate weighing articles in a different load cell capacity. When the coil weighing apparatus 10 is disassembled, the guide shaft 52 may be changed to increase or decrease the travel of the guide sleeve 54 along the guide shaft as may be required in different operating environments. If necessary, the platform 30 and the base 20 may be replaced separately further reducing the maintenance costs of the weighing apparatus 10. Additionally, if the weighing apparatus 10 is to be used with coils of different sizes or shapes, the platform 30 may be changed to accommodate the coil to be weighed.

The weighing apparatus 10 may be reassembled by lowering the platform 30 such that the guide shaft 52 engages the guide sleeve 54 to operatively connect the platform 30 and the base 20. The guide shaft 52 or the guide sleeve 54, or both, may provide a lead-in taper to assist in aligning the platform 30 over the base 20 during reassembly. The reassembly of the weighing apparatus 10 may also therefore reduce the total required maintenance time and may increase the operational efficiency and utilization of the system.

Load cells 40 may be changed or removed without fully disassembling the platform 30 from the base 20. The bolts 42 may be removed while the platform 30 is at rest over the base 20. Then, the platform may be lifted about 1 or 2 centimeters to separate the platform 30 from the load cells 40, enabling the load cells to be removed. In this way, the time to replace the load cell is reduced, thereby reducing downtime and cost.

Operation of the coil weighing apparatus 10 may begin when an article, for example a steel coil 12, is positioned onto the platform 30. When a coil or other article is positioned upon the platform 30, the platform presses on the load cells 40. The load cells 40 generate a signal corresponding to the weight of the article, and the weight of the article may then be calculated. In one example, a single load cell 40 may be used and the weight of the article calculated from that signal provided. In another example, three load cells 40 may be used and the weight of the article may be calculated from the signals of the three load cells. Additionally, the weight of the platform 30 may be subtracted from the weight measured by the load cells 40 to determine the true weight of the article. The weight of the article may be calculated by a computer or other machine and used in a production process; however, the weight may also be simply presented for display to an operator. The coil weighing apparatus 10 may also provide for temperature compensation to reduce errors in the calculated weight of the article caused by expansion or contraction of the load cell. Temperature compensation may be a feature of the load cell 40 or may be performed through post-processing of the signal produced by the load cell. Additional compensation for temperature, vibration, or other environmental factors may also be performed. Methods for compensating for temperature drift and other errors associated with weighing articles are well known to those of skill in the art.

Figure 8:
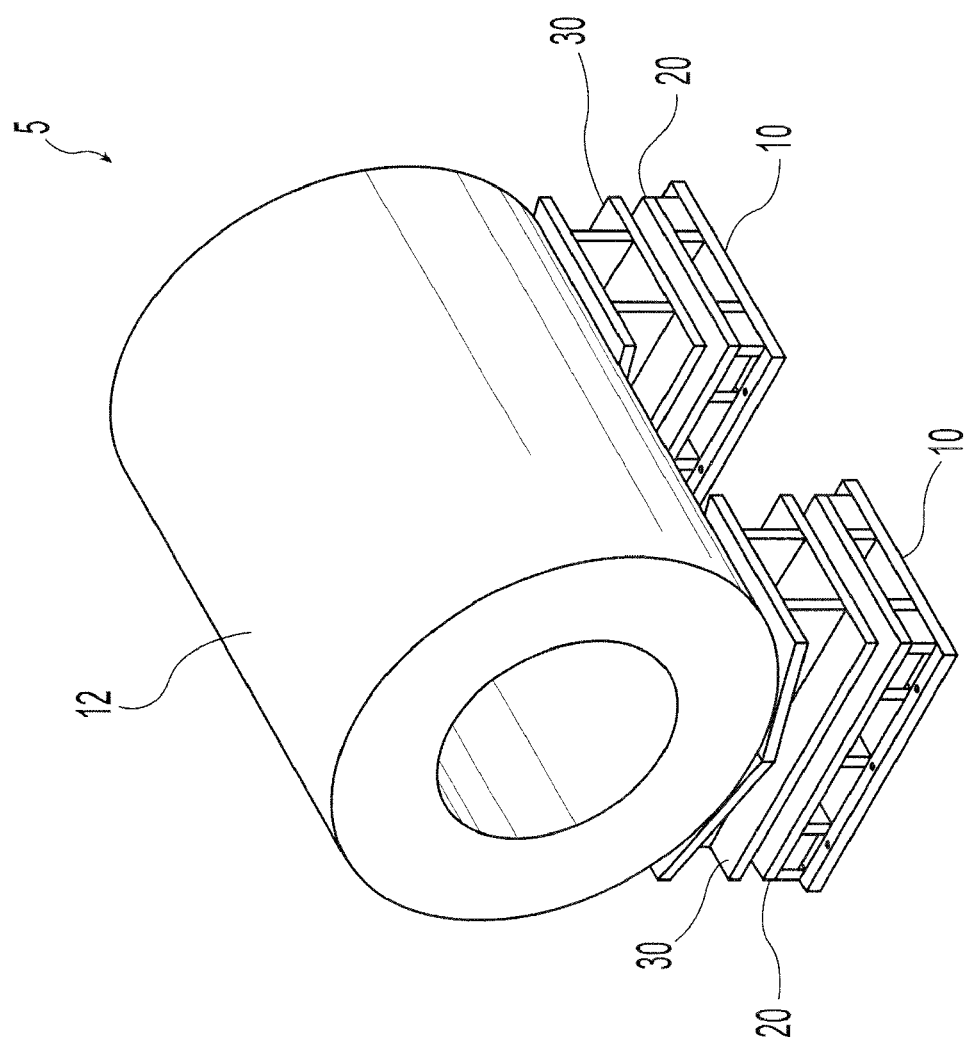
FIG. 8 is a perspective view of a coil scale system comprising two weighing apparatuses.

One or more weighing apparatuses 10 may be utilized in a coil weighing system 5, as shown in FIG. 8. In one example, the weighing system 5 may include two weighing apparatuses 10 for weighing a coil 12. A coil 12 may be transported to the coil weighing system 5 by a coil walking beam (not shown). The use of two coil weighing apparatus 10 may allow the walking beam to pass between the two weighing apparatus 10 before setting the coil onto the platforms 30. Further, the use of two weighing apparatus 10 may also permit the selection of less expensive load cells 40 and guides 50 as the weight of the article may be divided between two scales.

The coil weighing system 5 may also include a selection of platforms 30. Different platforms 30 may be desired for measuring coils 12 of various sizes. A weighing system 5 adapted to employ a variety of platforms 30 may be easily reconfigured for weighing different coil sizes, thereby reducing change-over time of the system and reducing maintenance costs. The coil weighing system 5 may also include a variety of load cells 40 for weighing coils of different weights. A coil weighing system 5 adaptable to various combinations of coil weight and size may reduce the operational and maintenance costs of such a system relative to past weighing systems. The coil weighing system 5 may further include a computer, programmable logic controller, or other processor (not shown) or equivalent equipment for controlling the weighing system and recording and/or analyzing load cell signals and measurements.

While the invention has been described with detailed reference to one or more embodiments, the disclosure is to be considered as illustrative and not restrictive. Modifications and alterations will occur to those skilled in the art upon a reading and understanding of this specification. It is intended to include all such modifications and alterations in so far as they come within the scope of the claims, or the equivalents thereof.

What is claimed is:

1. A weighing apparatus comprising:
    a base having a structure capable of supporting the weighing apparatus and an article to be weighed, and having at least two base portions capable of contacting a load cell;
    a platform positioned above the base and having at least two platform portions capable of contacting a load cell and readily removable from the base with minimal tools to enable removal of the load cells;
    at least two load cells each positioned between at least one base portion and at least one platform portion and capable of providing a signal corresponding to the weight of the article to be weighed; and
    at least two guides offset from the load cells capable of aligning the base and the platform, each guide having a portion operably positioned on the base and a corresponding portion operably positioned on the platform.

2. The weighing apparatus of claim 1, the platform including a saddle capable of retaining a coil of steel.

3. The weighing apparatus of claim 1, at least one load cell being attached to a platform portion.

4. The weighing apparatus of claim 1, at least one load cell being attached to a base portion.

5. The weighing apparatus of claim 1, comprising at least three load cells.

6. The weighing apparatus of claim 5, where the load cells are positioned in a non-linear arrangement.

7. The weighing apparatus of claim 1 where at least one guide portion comprises a guide shaft attached to the platform.

8. The weighing apparatus of claim 1 where at least one guide portion comprises a guide shaft attached to the base.

9. The weighing apparatus of claim 1 where at least one guide portion comprises a guide shaft and at least one portion comprises a guide sleeve capable of aligning the platform and the base.

10. The weighing apparatus of claim 1, where at least one guide comprises a linear bearing.

11. The weighing apparatus of claim 1, comprising at least one guide having a precision linear bearing and at least one guide having a self-aligning linear bearing.

12. The weighing apparatus of claim 11, comprising four guides, where one guide comprises a precision linear bearing and three guides each comprise a self-aligning linear bearing.

* * * * *